United States Patent
Danilov et al.

(10) Patent No.: US 10,817,388 B1
(45) Date of Patent: Oct. 27, 2020

(54) RECOVERY OF TREE DATA IN A GEOGRAPHICALLY DISTRIBUTED ENVIRONMENT

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 382 days.

(21) Appl. No.: 15/656,382

(22) Filed: Jul. 21, 2017

(51) Int. Cl.
*G06F 11/00* (2006.01)
*G06F 11/14* (2006.01)
*G06F 11/07* (2006.01)

(52) U.S. Cl.
CPC ...... *G06F 11/1471* (2013.01); *G06F 11/1451* (2013.01); *G06F 11/1464* (2013.01); *G06F 11/1469* (2013.01); *G06F 11/0793* (2013.01); *G06F 2201/80* (2013.01); *G06F 2221/0788* (2013.01)

(58) Field of Classification Search
CPC .............. G06F 11/1471; G06F 11/1469; G06F 11/2094; G06F 11/2097; G06F 11/203; G06F 11/1451; G06F 11/2069; G06F 11/1448; G06F 11/0793; G06F 11/1464; G06F 11/1435; G06F 3/067; G06F 16/27; G06F 16/2246; G06F 2201/80; Y10S 707/99953
See application file for complete search history.

(56) References Cited

U.S. PATENT DOCUMENTS

| 5,675,802 | A | 10/1997 | Allen et al. |
| 5,805,788 | A | 9/1998 | Johnson |
| 5,950,225 | A | 9/1999 | Kleiman |
| 7,389,393 | B1 | 6/2008 | Karr et al. |
| 8,370,542 | B2 | 2/2013 | Lu et al. |
| 8,495,465 | B1 | 7/2013 | Anholt et al. |

(Continued)

OTHER PUBLICATIONS

"Standard Raid Levels—RAID 6" Wikipedia. [https://en.wikipedia.org/wiki/Standard_RAID_levels#RAID_6], retrieved Oct. 18, 2019, 11 pages.

(Continued)

*Primary Examiner* — Diedra McQuitery
(74) *Attorney, Agent, or Firm* — Amin, Turocy & Watson, LLP

(57) ABSTRACT

The described technology is generally directed towards recovery of an impacted (damaged) tree in an impacted zone in a geographically distributed data storage environment, using a peer tree in a remote zone. A peer zone is selected for recovery, and updated to have current data. Logic at the impacted zone requests recovery of an impacted tree, identifying one or more recovery ranges for which recovery data is needed. Logic at the peer zone locates missing objects via the peer tree, and provides recovery information to the impacted zone, by which recovery of the impacted tree is able to be accomplished. For example, a replication journal may be returned as a tree recovery journal comprising add leaf (object) instructions, whereby the impacted zone processes the journal with respect to a reduced representation of the impacted tree to obtain a recovered tree.

20 Claims, 10 Drawing Sheets

(56) References Cited

U.S. PATENT DOCUMENTS

| | | |
|---|---|---|
| 8,832,234 B1 | 9/2014 | Brooker et al. |
| 8,856,619 B1 | 10/2014 | Cypher |
| 8,972,478 B1 | 3/2015 | Storer et al. |
| 9,063,838 B1 | 6/2015 | Boyle et al. |
| 9,244,761 B2 | 1/2016 | Yekhanin et al. |
| 9,274,903 B1 | 3/2016 | Garlapati et al. |
| 9,280,430 B2 | 3/2016 | Sarfare et al. |
| 9,477,682 B1 | 10/2016 | Bent et al. |
| 9,641,615 B1 | 5/2017 | Robins et al. |
| 10,055,145 B1 | 8/2018 | Danilov et al. |
| 10,282,262 B2 | 5/2019 | Panara et al. |
| 10,361,810 B2 | 7/2019 | Myung et al. |
| 10,503,611 B1 | 12/2019 | Srivastav et al. |
| 10,733,053 B1 | 8/2020 | Miller et al. |
| 2002/0166026 A1 | 11/2002 | Ulrich et al. |
| 2005/0088318 A1 | 4/2005 | Liu et al. |
| 2005/0140529 A1 | 6/2005 | Choi et al. |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2007/0239759 A1* | 10/2007 | Shen .................. G06F 16/134 |
| 2007/0250674 A1 | 10/2007 | Findberg et al. |
| 2008/0320061 A1 | 12/2008 | Aszmann et al. |
| 2009/0172464 A1 | 7/2009 | Byrne et al. |
| 2009/0259882 A1 | 10/2009 | Shellhamer |
| 2010/0031060 A1 | 2/2010 | Chew et al. |
| 2010/0218037 A1 | 8/2010 | Swartz et al. |
| 2010/0332748 A1 | 12/2010 | Van der Goot et al. |
| 2011/0138148 A1 | 6/2011 | Friedman et al. |
| 2011/0196833 A1 | 8/2011 | Drobychev et al. |
| 2011/0246503 A1* | 10/2011 | Bender .................. G06F 9/546 707/769 |
| 2012/0023291 A1 | 1/2012 | Zeng et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1* | 2/2013 | Mordani ............. H04L 67/1034 709/228 |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0246876 A1 | 9/2013 | Manssour et al. |
| 2014/0064048 A1 | 3/2014 | Cohen et al. |
| 2014/0280375 A1* | 9/2014 | Rawson .................. G06F 16/21 707/803 |
| 2014/0297955 A1 | 10/2014 | Yamazaki et al. |
| 2014/0380088 A1 | 12/2014 | Bennett et al. |
| 2014/0380125 A1 | 12/2014 | Calder et al. |
| 2015/0134626 A1 | 5/2015 | Theimer et al. |
| 2015/0186043 A1 | 7/2015 | Kesselman et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1* | 2/2016 | Patterson, III ...... G06F 11/1076 714/6.2 |
| 2016/0162378 A1 | 6/2016 | Garlapati et al. |
| 2016/0232055 A1 | 8/2016 | Vairavanathan et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0380650 A1 | 12/2016 | Calder |
| 2017/0003880 A1 | 1/2017 | Fisher et al. |
| 2017/0004044 A1 | 1/2017 | Tormasov et al. |
| 2017/0097875 A1 | 4/2017 | Jess et al. |
| 2017/0102993 A1 | 4/2017 | Hu et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0262187 A1 | 9/2017 | Manzanares et al. |
| 2017/0286516 A1 | 10/2017 | Horowitz et al. |
| 2018/0052744 A1 | 2/2018 | Chen et al. |
| 2018/0063213 A1 | 3/2018 | Bevilacqua-Linn et al. |
| 2018/0129417 A1 | 5/2018 | Sivasubramanian et al. |
| 2018/0181324 A1 | 6/2018 | Danilov et al. |
| 2018/0181612 A1 | 6/2018 | Danilov et al. |
| 2018/0267856 A1 | 9/2018 | Hayasaka et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2019/0028179 A1 | 1/2019 | Kalhan |
| 2019/0043201 A1 | 2/2019 | Strong et al. |
| 2019/0043351 A1 | 2/2019 | Yang et al. |
| 2019/0065310 A1 | 2/2019 | Rozas |
| 2019/0205437 A1 | 7/2019 | Larson et al. |
| 2019/0384500 A1 | 12/2019 | Danilov et al. |
| 2019/0386683 A1 | 12/2019 | Danilov et al. |

OTHER PUBLICATIONS

Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.

(56) References Cited

OTHER PUBLICATIONS

Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.

* cited by examiner

RECOVERY OF TREE DATA IN A GEOGRAPHICALLY DISTRIBUTED ENVIRONMENT

BACKGROUND

Contemporary cloud-based storage systems such as Dell EMC® Elastic Cloud Storage (ECS™) use a search tree implementation to store metadata and system data, unlike traditional storage systems that use databases. For example, ECS™ uses a version of a B+ tree data structure comprising a root node, internal nodes, and leaves, in which each internal node contains only keys, while the leaves contain key-value pairs.

Trees reference and correspond to data stored in chunks, with each tree element (node or leaf) stored in a single page within the pages of a chunk. Chunk content is modified in an append-only mode such that when a chunk becomes full enough, the chunk gets sealed. The content of sealed chunks, comprising tree elements, is thus immutable. To provide point-in-time consistent views, trees are maintained under Multi-Version Concurrency Control policy (MVCC).

Despite data protection techniques such as mirroring and erasure coding, there remains a chance that a tree chunk may become unavailable, e.g., corrupt or lost. In general, data corruption and other hardware failures are unavoidable. The unavailability of a tree chunk for a cloud-based storage systems means that a part of a tree or even an entire tree is lost. This may result in a massive data loss.

SUMMARY

Briefly, one or more aspects of the technology described herein are directed towards recovering an impacted tree of an impacted zone of a geographically distributed storage environment resulting in a recovered tree. The impacted tree comprises an impacted tree part, the impacted tree part comprising one or more tree elements that are unavailable within the impacted tree. The recovering comprises sending update-related information from the impacted zone to a peer zone for use by the peer zone in updating a peer tree of the peer zone, identifying a recovery range corresponding to the impacted tree part, and sending the recovery range to the peer zone. Aspects include receiving a tree recovery journal from the peer zone corresponding to the recovery range, and processing the tree recovery journal to recover the impacted tree part to generate the recovered tree.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards using information within a geographically distributed peer tree in a remote zone to recover a search (e.g., B+) tree after a part of the tree (which may be the entire tree) is lost. The recovery includes unavailable data of the tree chunk or chunks that used to contain some elements of the tree (nodes and leaves).

As will be understood, in one or more implementations the technology described herein may apply existing cloud storage (e.g., Dell EMC® Elastic Cloud Storage, or ECS™) mechanisms, such as journaling of updates and replication, at the chunk level. In general, the technology provides for non-disruptive recovery, without adverse effects to the storage system.

As generally used herein, the term "zone" refers to a replicated data storage unit (e.g., a cluster in a data center) or the like, with multiple zone remote relative to each other within a replicated geographically distributed storage environment. For example, ECS™ supports geographically distributed setups comprising two or more zones. An "impacted" tree is one that has at least a part of the tree unavailable, with recovery attempted from a "peer" tree of a remote zone.

It should be understood that any of the examples herein are non-limiting. For instance, some of the examples are based on ECS™ cloud storage technology; however virtually any tree-based storage may benefit from the technology described herein. Further, while a modified version of B+ trees are exemplified herein, other trees and structures may benefit from the technology described herein. Thus, any of the embodiments, aspects, concepts, structures, functionalities or examples described herein are non-limiting, and the technology may be used in various ways that provide benefits and advantages in computing and data storage in general.

Figure 1:
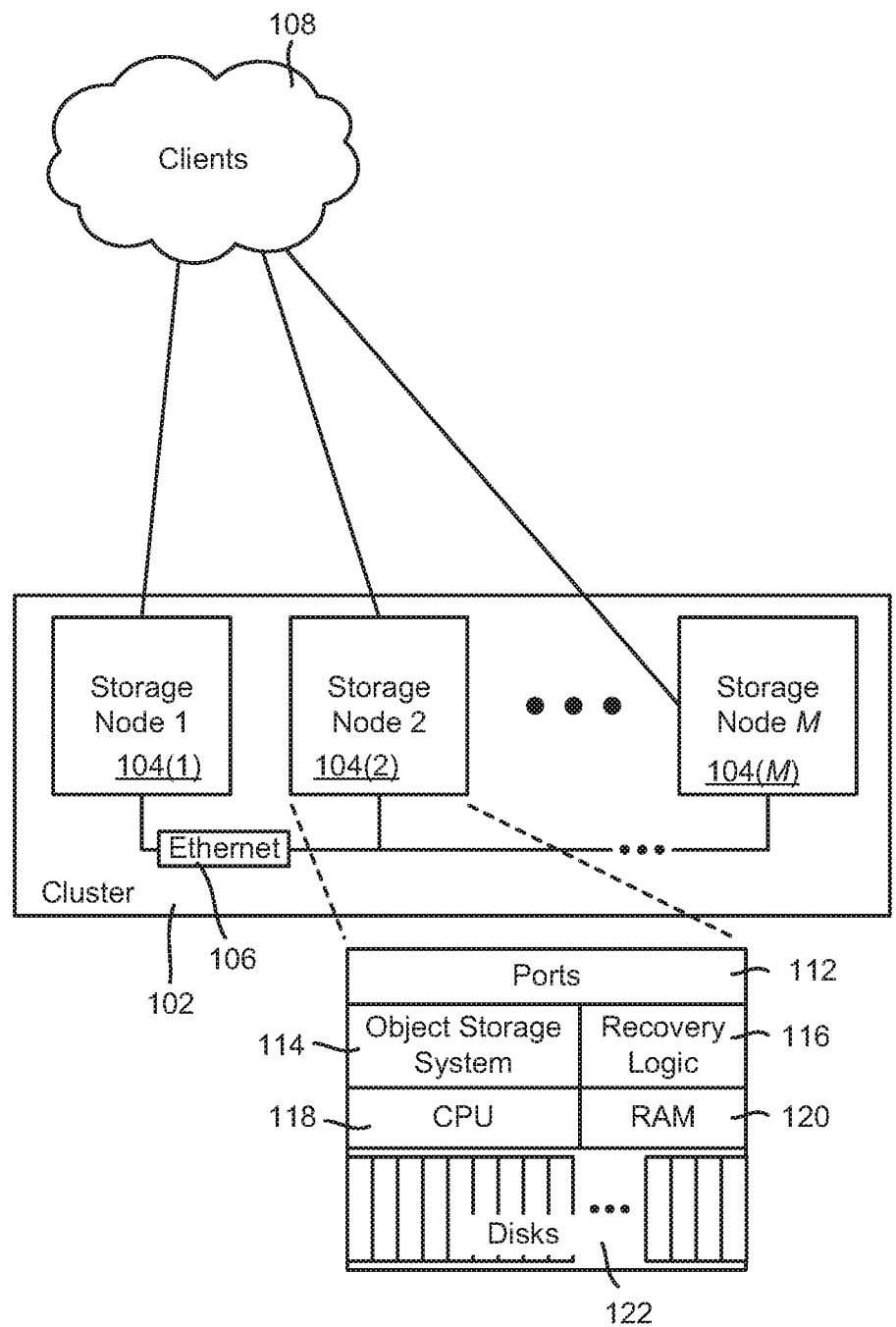
FIG. 1 is an example block diagram representation of part of a cloud data storage system including nodes, in which recovery logic allows recovery of an impacted tree, according to one or more example implementations.

FIG. 1 shows part of a cloud data storage system such as ECS™ comprising a zone (e.g., cluster) 102 of storage nodes 104(1)-104(M), in which each node is typically a server configured primarily to serve objects in response to client requests. The nodes 104(1)-104(M) are coupled to each other via a suitable data communications link comprising interfaces and protocols such as represented in FIG. 1 by Ethernet block 106.

Clients 108 make data system-related requests to the cluster 102, which in general is configured as one large object namespace; there may be on the order of billions of objects maintained in a cluster, for example. Note that in one or more implementations, a "cluster" is basically a "zone." To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of an object storage system 114 and data services, including remote tree recovery logic 116. A CPU 118 and RAM 120 are shown for completeness; note that the RAM 120 may comprise at least some non-volatile RAM. The node includes storage devices such as disks 122, comprising hard disk drives and/or solid-state drives.

Figure 2:
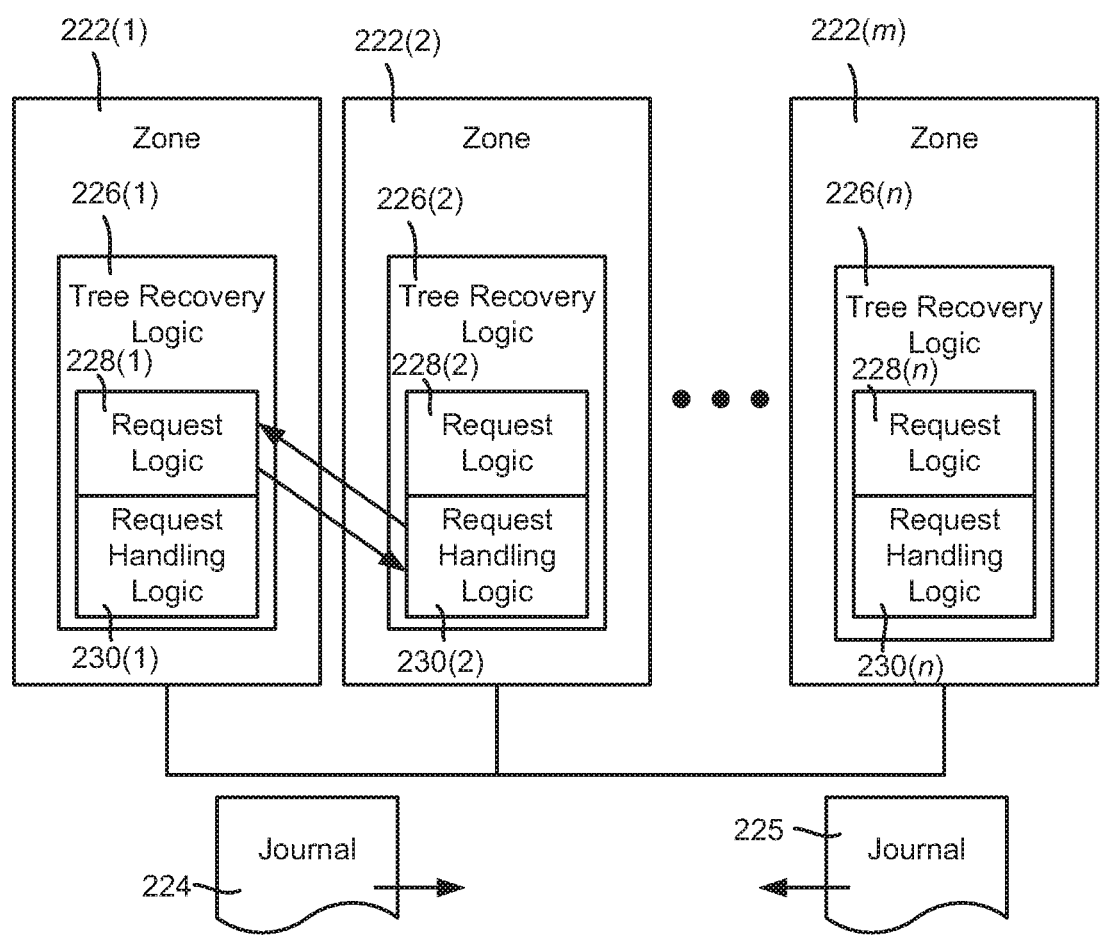
FIG. 2 is an example block diagram representation of the zones of a geographically distributed cloud storage system that facilitate recovery of an impacted tree in an impacted zone, according to one or more example implementations

FIG. 2 shows a general concept of zones 222(1)-222(m), in which the zones are replicated by exchanging updates via journals. In FIG. 2, two such journals 224 and 225 are shown, however it is understood that any number of journals may be exchanged, and that journals may be exchanged at any time. Journals are further described herein with reference to FIG. 3.

As described herein, tree recovery logic 226(1)-226(n) is present within each zone (that is, in each cluster; note however that in alternative implementations it is feasible to have multiple clusters within a zone). The tree recovery logic may be implemented for an entire zone/cluster, or within each storage node of each cluster, for example. In general, the tree recovery logic 226(1)-226(n) includes request logic 228(1)-228(n), respectively, to request tree recovery from a peer tree in a remote zone, and request handling logic 230(1)-230(n), respectively, to handle the recovery requests and return information to an impacted zone that is requesting recovery.

Figure 3:
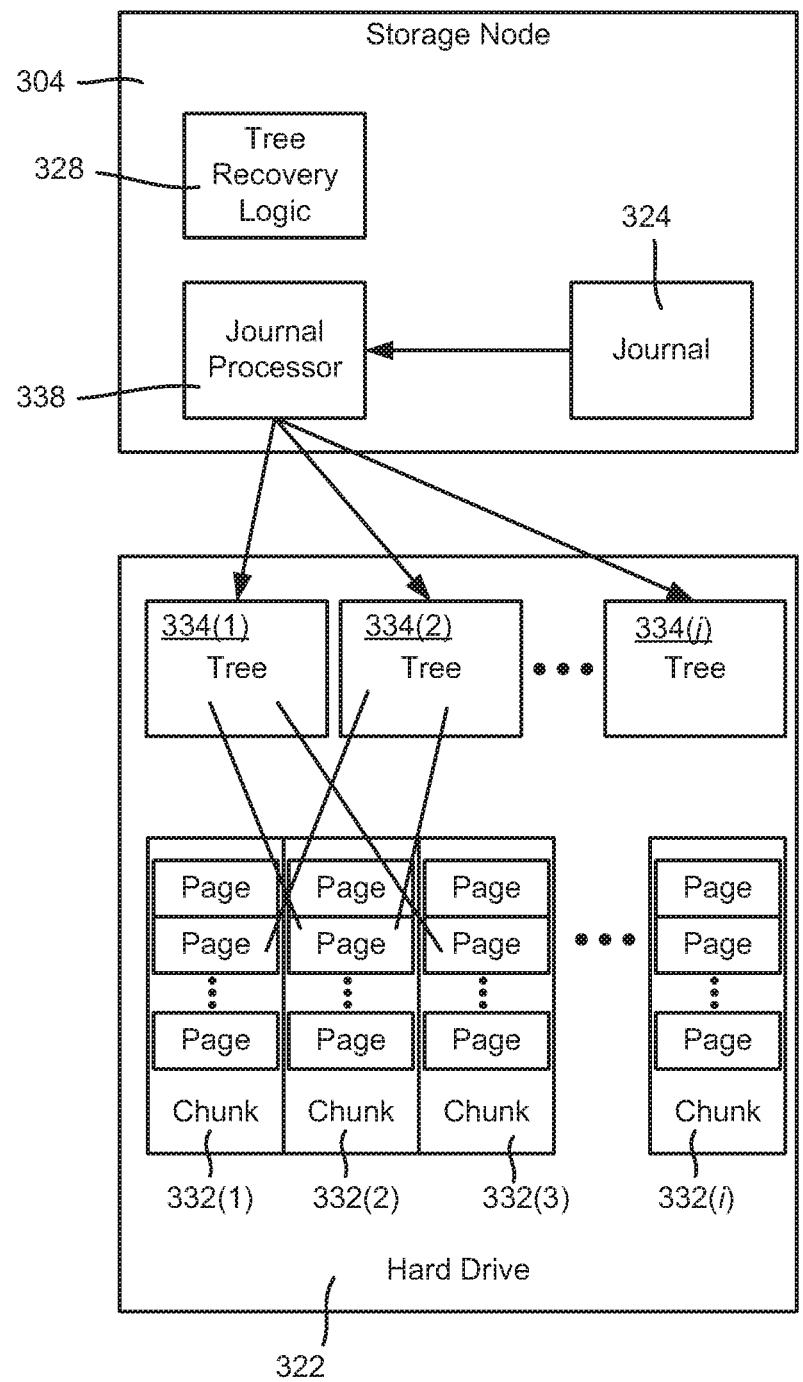
FIG. 3 is an example representation of a storage node maintaining trees for tracking and finding data, according to one or more example implementations.

FIG. 3 shows some example details of a single storage node 304 and one of the storage units (e.g., a hard drive 322) managed thereby. Using the example of ECS™ technology, in ECS™ the hard drive space is partitioned into a set of blocks of fixed size, referred to as chunks; and number of chunks 332(1)-332(i) are shown in FIG. 3. For any practical number of trees 334(1)-334(j), each tree element (node or leaf) is stored in a single page, wherein each page occupies continuous space of a single tree chunk. Trees may share chunks, that is, one chunk can contain elements of different trees.

As described above, chunk content is modified in append-only mode and a chunk is sealed when considered full, whereby the content of sealed chunks and thus tree elements is immutable. Each tree update means a reallocation of at least N pages, where N is the current depth of the tree. In particular, the root changes after each tree update. As a result, a single tree update is an expensive operation, and thus trees are not updated for a single data update. Instead, each tree has a journal 324 of data updates, and when the journal 328 is full enough, a journal processor 338 implements a bulk tree update (processes, or "plays" the journal) in order to minimize the total cost of the update. Note that tree journals are stored in journal chunks, e.g., in a suitable memory or other storage location.

Returning to FIG. 2, ECS™ supports geographically distributed setups comprising two or more zones. A tree in one zone may have a peer tree in a remote zone. In order to eliminate the probability of a conflict, each object in a tree (identified with a key) has a primary zone. The primary zone of an object handles requests related to the object.

The distributed storage system tries to keep peer trees synchronized. To do so, zones share tree journals via replication that works at the journal chunk level. Each zone processes ("replays") the journals it receives from other zones and updates its local trees accordingly.

Figure 4:
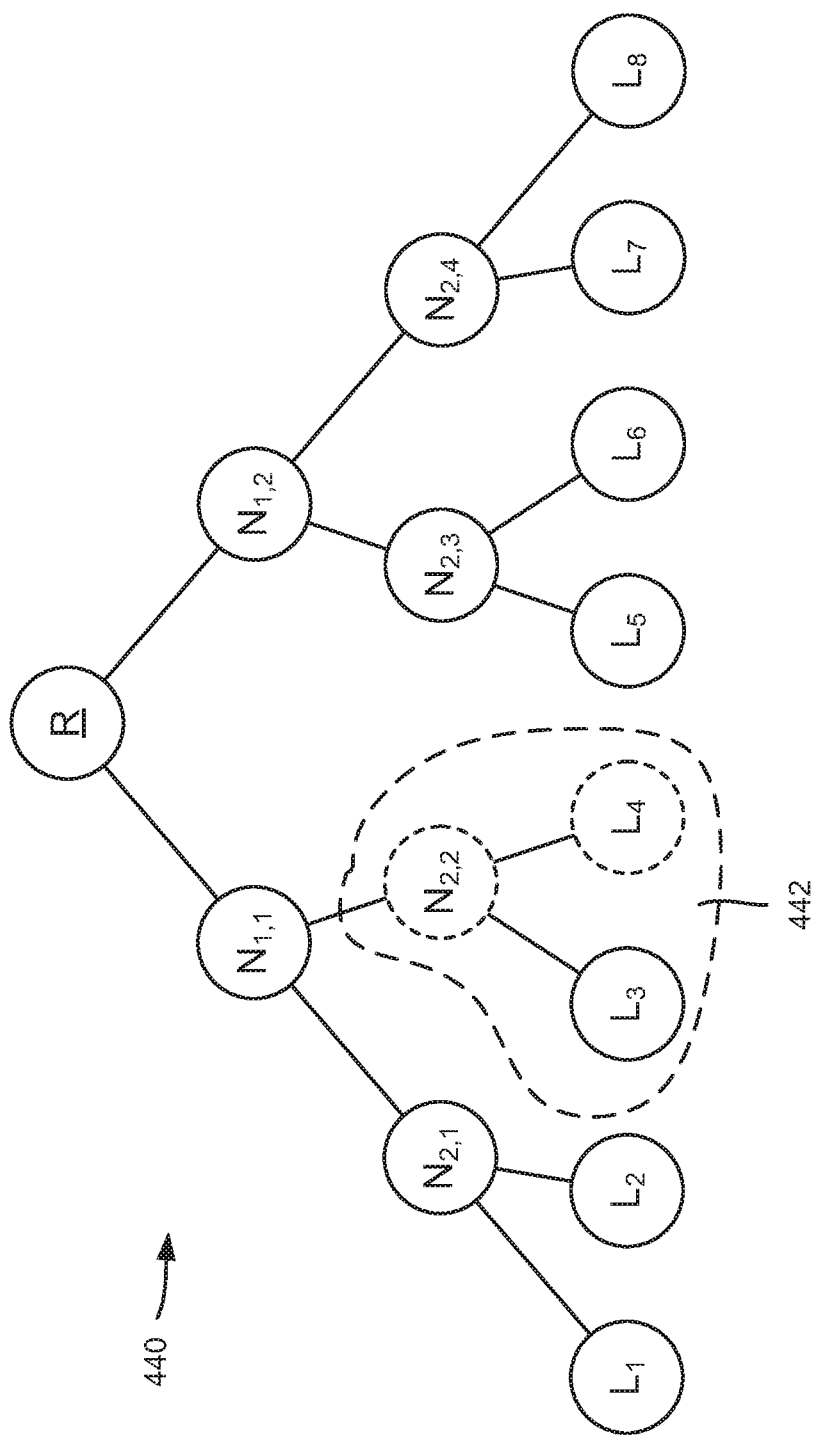
FIG. 4 is an example representation of a tree in which part of the tree has become unavailable, according to one or more example implementations.

Turning to an example, in FIG. 4, there is a B+ tree of depth four (with two levels of nodes beneath the root node R), and there are eight leaves $L_1$-$L_8$ that maintain key-value pairs. For the sake of simplicity, consider that each leaf contains one key-value pair. Also note that there is only one tree shown in the example of FIG. 4; however the technology described herein extends in a straightforward manner to recover multiple damaged trees.

As set forth above, one or more parts of a tree (which may be the entire tree) may become unavailable, as generally represented in the simplified tree 440 of FIG. 4. For example, consider that an unavailable chunk contained one node ($N_{2,2}$) and one leaf ($L_4$) of the tree. These tree elements are shown with a dashed circle in contrast to the solid circles of other tree elements. Note that the number of tree elements that become unavailable may be larger than the number of directly impacted elements. For example, in the example of FIG. 4, only the two previously mentioned elements are impacted directly, e.g., by a hardware failure or corruption. However, there is one more tree element, the leaf $L_3$, that becomes unavailable because it becomes unreachable from the root R after the node $N_{2,2}$ is lost. Thus, as in FIG. 4, the part of the tree 442 that is unavailable is outlined with a dashed line. Similarly an entire tree may be lost after just one element, its root, is lost.

Figure 5:
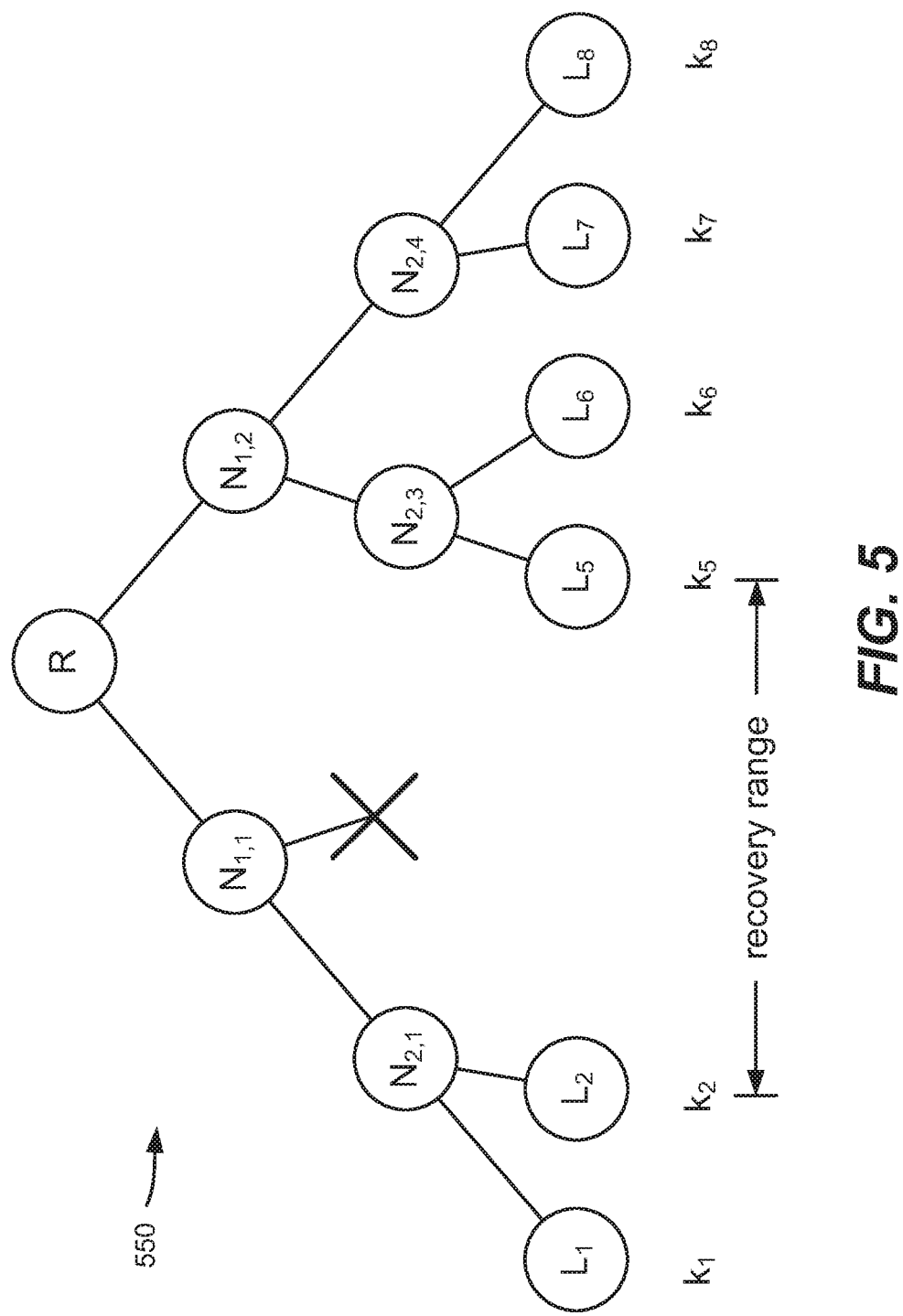
FIG. 5 is an example representation of a tree in which part of the tree has been cut off to provide a reduced tree, according to one or more example implementations.

Because there is no practical way to recover the tree right away, the reference to the unavailable part of the tree (or references to multiple unavailable parts) may be cut off, as generally represented by the reduced tree 550 in FIG. 5. After this operation the tree is no longer complete, but is consistent in some ways. However, it is very likely that the remaining tree has a bad balance.

In one or more implementations, instead of rebalancing the reduced tree, tree rebalancing is blocked (suspended) until the recovery operation is over. This is based on the assumption that after the recovery is over, the tree will have a layout/structure that is close to the layout of the original tree. Otherwise, the tree may be rebalanced multiple times during the recovery session, which may produce severe additional load and a lot of garbage (as the tree is under Multi-Version Concurrency Control).

With respect to recovery, the reduced tree 550 is used to identify a range of key values the lost objects might have had. This is represented in FIG. 5 as the recovery range, which in this example is the open interval between $k_2$ and $k_5$. The range may start with minus infinity when there is no leaf to the left from the lost part of the tree; similarly the range may end with plus infinity when there is no leaf to the right from the lost part of the tree. Thus, the range may be from minus infinity to plus infinity when the entire tree is lost. In one or more implementations, there may be multiple recovery ranges when there are two or more independent lost parts of the tree.

Before the recovery range can be applied to a peer tree from a remote zone, the remote zone ensures that its version of the tree is up-to-date. To this end, the impacted zone needs to output its journal or journals (drain its replication queue of journals) before (or as part of) requesting a remote zone for geographically distributed (GEO) recovery.

A remote zone that will handle GEO recovery for the tree may be chosen using any suitable selection criterion or criteria. For example, information about the zones may be available as selection criteria, from which the remote selected zone may be a most stable zone, the zone that is least loaded, and/or a zone that has the highest throughput between it and the impacted zone. Other criteria may be used instead of or in addition to any or all of the above information. Indeed, there may be only one peer zone having a peer tree.

When a GEO recovery request for a tree comes to the remote selected zone, the selected zone replays the journals for its tree, thereby making the tree up to date. This includes the selected zone's own journals as well as those drained from the impacted zones replication queue.

Once updated, the remote zone finds the objects within the recovery range, which is a basic operation for a search tree. As set forth above, each object has a primary zone; in order to minimize the probability of a conflict, the remote zone makes itself the primary zone for any object from the recovery range that has the impacted zone as a primary one.

In one or more implementations, the remote zone produces a "recovery" tree journal for the impacted zone. The recovery tree journal contains an add request per object from the recovery range. The recovery tree journal is replicated to the impacted zone.

When received, the impacted zone replays the recovery tree journal to complete the recovery process. After the replaying process is over the tree may be rebalanced, e.g., rebalancing is unblocked/unsuspended.

Figure 6:
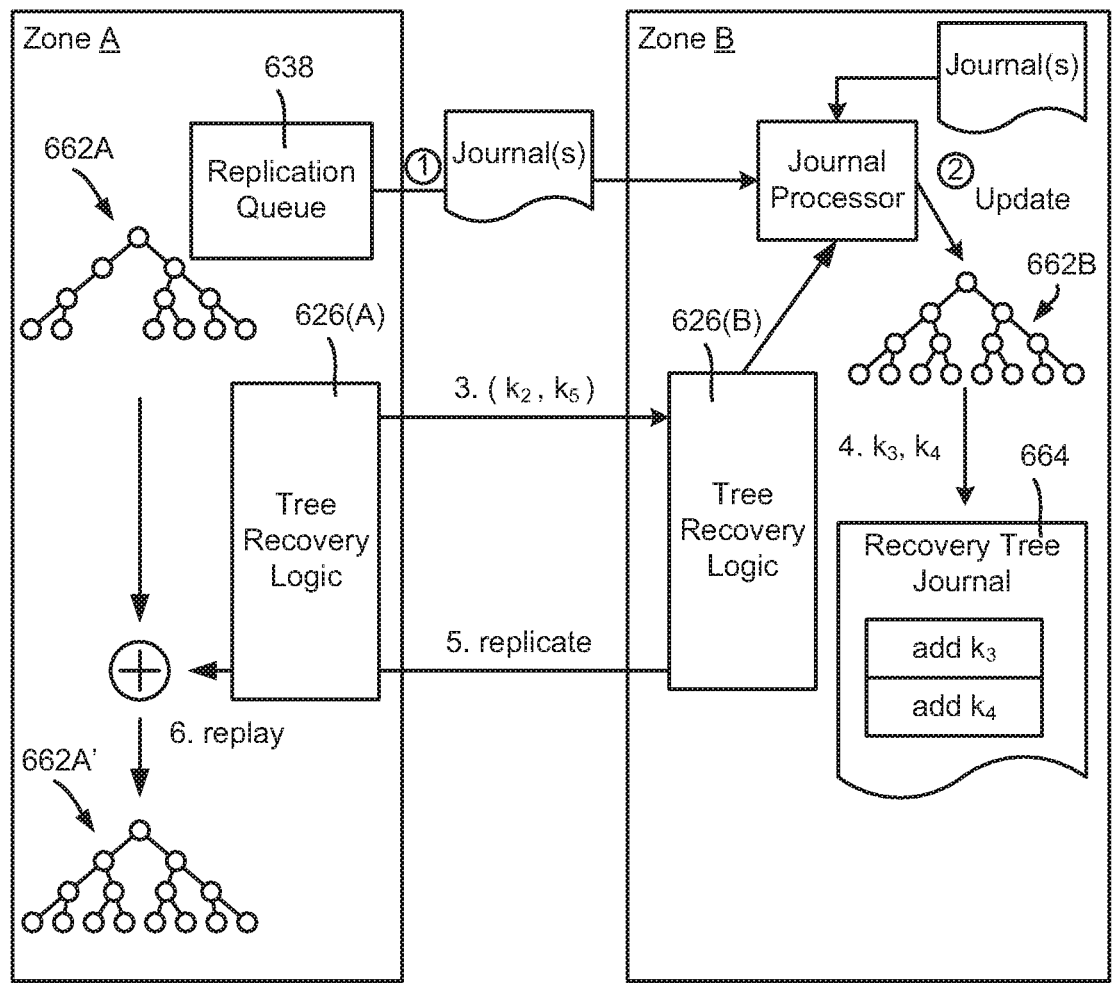
FIG. 6 is an example block diagram/data flow representation of zones, components and operations to recover an impacted tree, according to one or more example implementations.

FIG. 6 depicts the GEO recovery process in a straightforward way, once the tree recovery logic of the impacted zone A recognizes that a tree has been impacted and recovery is needed on a reduced tree 662(A), and a remote zone B with a peer tree 662(B) is selected. For example, a read request that attempts to access a node and comes back with failure may be used to recognize that recovery is needed, and/or other operations such as a maintenance operation may detect an impacted tree. The tree recovery logic 626(A) may cut off the impacted part (or parts) of the tree to provide the reduced tree 662A to determine the recovery range, and suspend rebalancing of the reduced tree 662A.

The exemplified recovery process of FIG. 6 continues with labeled arrow one (1) which represents the tree recovery logic 626(A) causing the replication queue 662 to be drained of its journals. The arrow labeled two (2) represents the journal processor 638 of the selected zone B updating the peer tree from its available journals, e.g., as triggered by a tree recovery logic 626(B).

The arrow labeled three (3) represents the recovery range being communicated to the tree recovery logic 626(B) of the selected remote peer zone B. The tree recovery logic 626(B) searches the peer tree 662B based on the recovery range and determines that keys $k_3$ and $k_4$ are missing from the impacted tree 662A. The tree recovery logic 626(B) (at labeled arrow four (4)) places these keys as "add" requests/instructions into a recovery tree journal 664, which is then replicated at labeled arrow five (5) to zone A. At labeled arrow six (6), the replicated tree is replayed, providing a recovered tree 662A', which is then allowed to rebalance.

Figure 7:
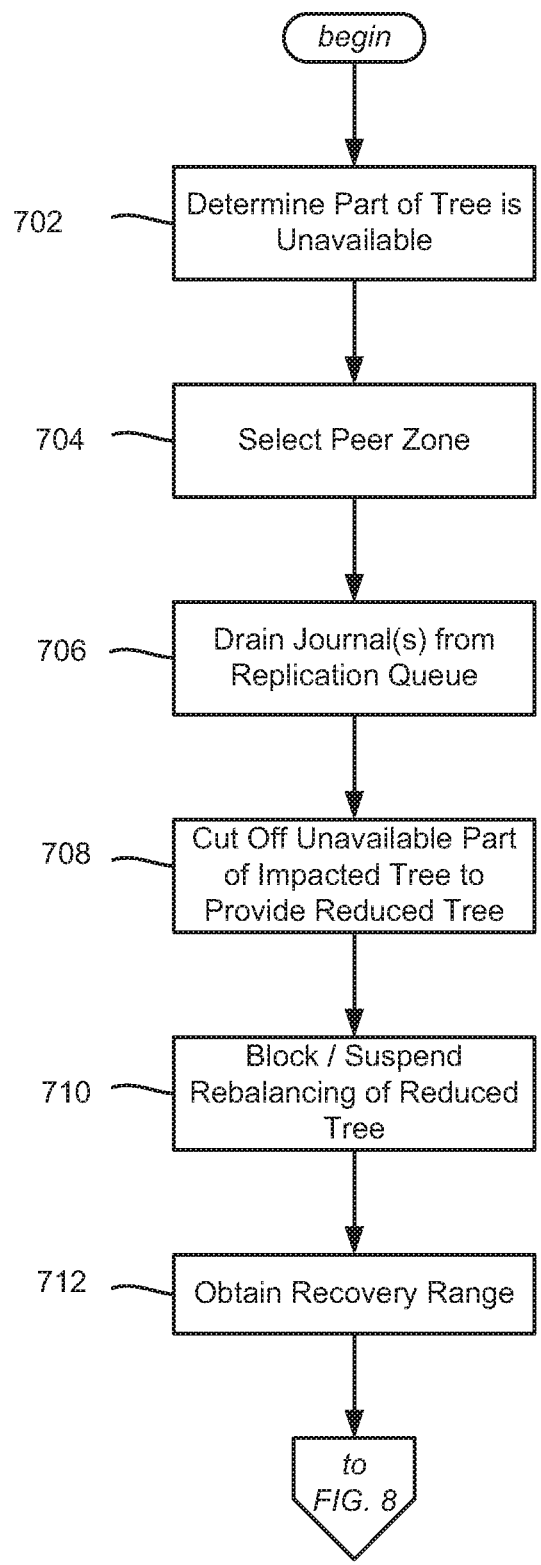
FIGS. 7 and 8 comprise a flow diagram showing example operations exemplified as steps related to requesting recovery of an impacted tree at an impacted zone, according to one or more example implementations.
Figure 8:
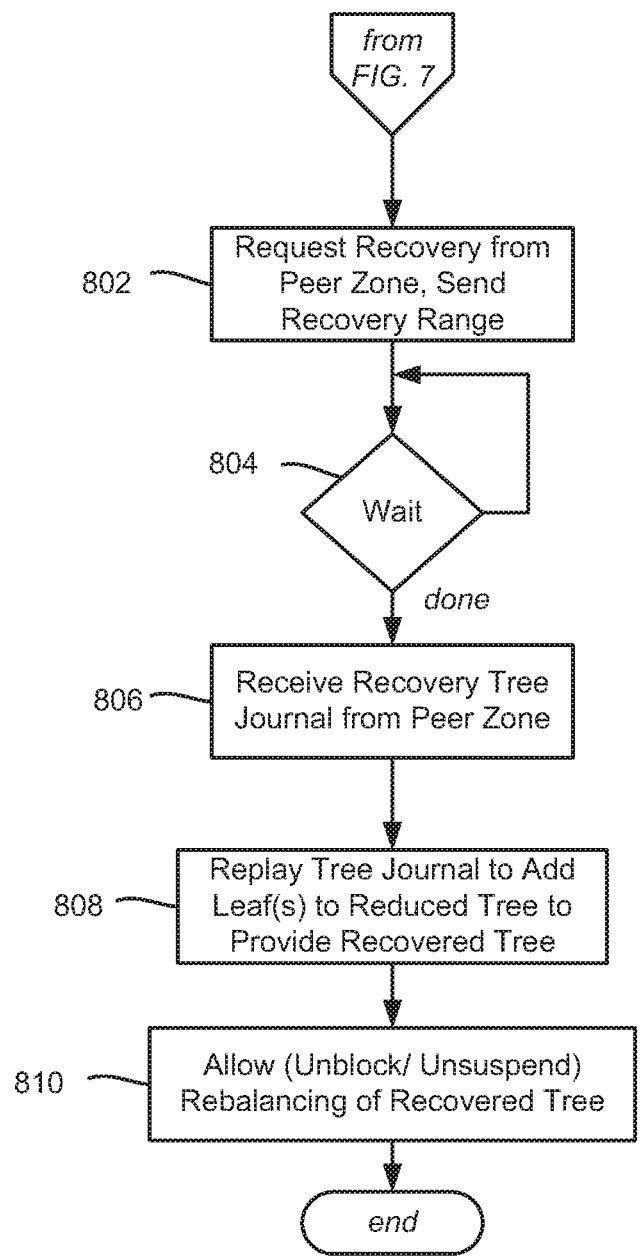

FIGS. 7 and 8 comprise a flow diagram of example logic/operations exemplified as steps for operations of the recovery logic at the impacted zone. Note that some of the steps may be ordered differently, and or performed in parallel or substantially in parallel.

In general, recovery begins when it is determined that some part (or parts) of a tree is unavailable, as generally represented by step 702. Step 704 represents selecting the peer zone as generally described above. Step 706 represents draining the journal(s) from the replication queue, whereby the peer tree will be updated. This may be part of a recovery request, or a separate operation with a subsequent recovery request triggering updating of the peer tree.

Step 708 represents cutting off the unavailable part of the impacted tree to provide a reduced tree, with step 710 blocking/suspending rebalancing of the reduced tree. Step 712 obtains the recovery range, e.g., by traversing the reduced tree and determining which node(s) and leave(s) are unavailable.

The exemplified operations continue at step 802 of FIG. 8, which represents requesting the recovery from the selected remote peer zone, which may send the recovery range(s) as part of the recovery request. Step 804 represents waiting for the response.

When done, step 806 represents receiving the recovery tree journal from the selected remote peer zone. Step 808 replays the recovery tree journal to add missing nodes and leafs to the reduced tree to provide the recovered tree. Step 810 represents allowing rebalancing of the recovered tree to resume.

Figure 9:
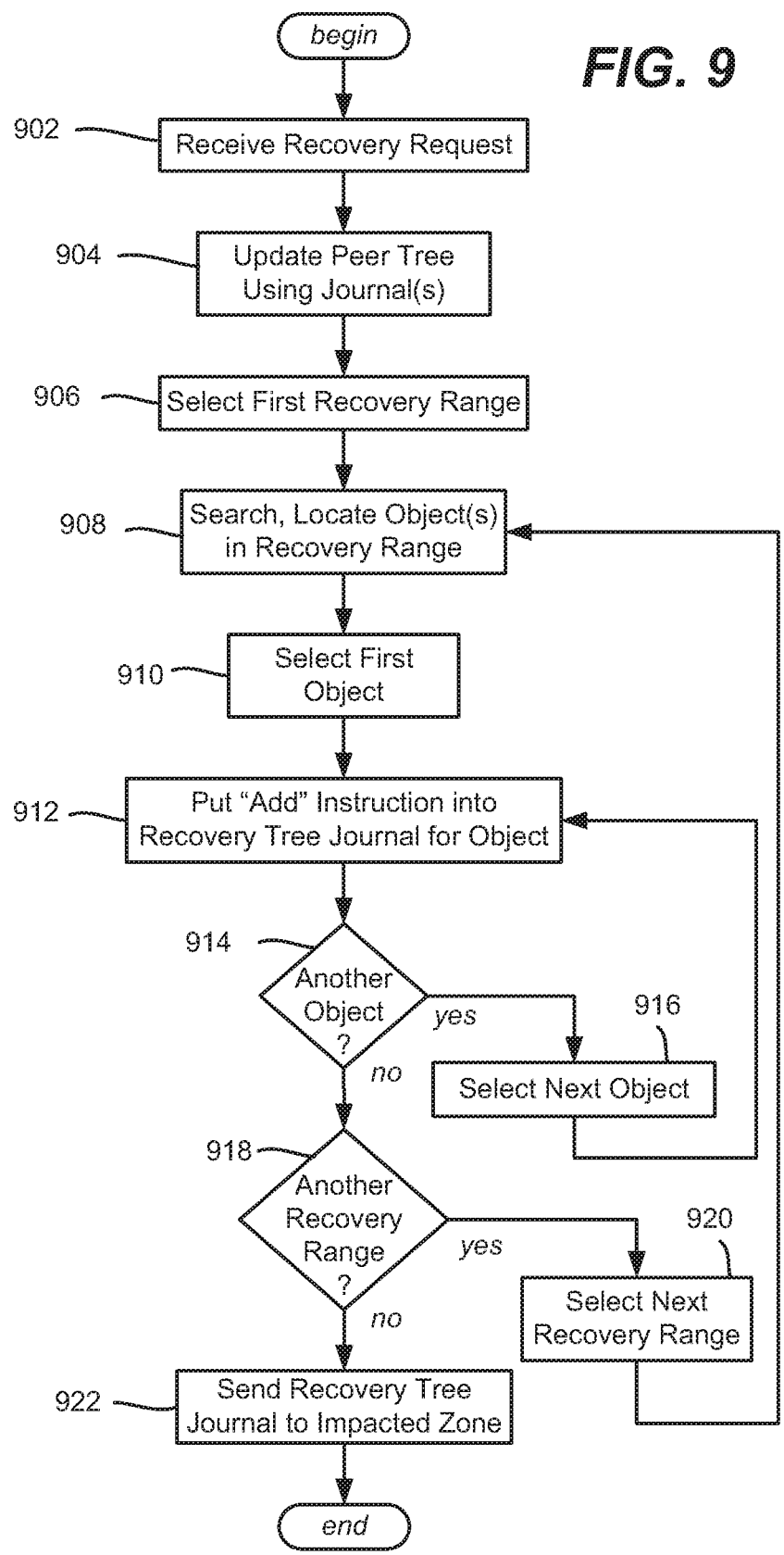
FIG. 9 is an example flow diagram representation showing example operations exemplified as steps related to receiving and handling a request for recovery of an impacted tree at a peer zone, according to one or more example implementations.

FIG. 9 represents a flow diagram of example logic/operations of the peer recovery request handling logic exemplified as steps, beginning at step 902 where the recovery request is received. Step 904 represents updating the peer tree using the journals, including any journals drained from the impacted tree's replication queue.

Step 906 represents selecting a first recovery range; note there may only be one recovery range. Step 908 searches the tree to locate the objects corresponding to the recovery range. Step 910 selects the first object that was located and step 912 puts an add instruction into the recovery tree journal for this selected object. Steps 914 and 916 repeat the process to put an add instruction into the tree recovery journal for each other object. Note that in an implementation in which multiple objects can be added to the tree recovery journal at once, the loop of step 914 and 916 is not needed.

Steps 918 in 920 repeat the process for each other recovery range, if more than one is provided. As can be readily appreciated, in an implementation in which multiple recovery ranges can be processed at once, e.g., in parallel, such a loop is replaced by parallel operations.

When the set of instructions needed to recover the impacted tree is complete, step 922 sends recovery tree journal to the impacted zone. Note that although not explicitly shown in FIGS. 8 and 9, it is feasible to recover multiple trees with a single request. For example, multiple tree identifiers, each associated with its needed recovery range(s), may be sent in a single recovery request from an impacted zone to a remote peer zone.

As can be seen, described herein is an efficient technology for recovering at least a part of a tree in an impacted zone from a peer tree in a remote zone. The technology uses existing cloud storage mechanisms where feasible, e.g., including tree searching, data update journals, journal replaying, and recovery tree journal replaying.

One or more aspects are directed towards recovering an impacted tree of an impacted zone of a geographically distributed storage environment resulting in a recovered tree. The impacted tree comprises an impacted tree part, the impacted tree part comprising one or more tree elements that are unavailable within the impacted tree. The recovering comprises sending update-related information from the impacted zone to a peer zone for use by the peer zone in updating a peer tree of the peer zone, identifying a recovery range corresponding to the impacted tree part, and sending the recovery range to the peer zone. Aspects include receiving a tree recovery journal from the peer zone corresponding to the recovery range, and processing the tree recovery journal to recover the impacted tree part to generate the recovered tree.

The tree recovery journal may comprise one or more instructions, and the processing of the tree recovery journal may comprise adding a leaf node to the recovered tree for at least some of the one or more instructions in the tree recovery journal.

The peer zone may be selected from available peer zones. Selecting the peer zone from the available peer zones may comprise selecting the peer zone based on stability information associated with the peer zone, load information associated with the peer zone, and/or throughput information associated with the peer zone.

Identifying the recovery range corresponding to the impacted tree part may comprise removing a reference, in a tree node, to an unavailable part of the impacted tree resulting in a reduced tree, and identifying the recovery range may comprise determining each unavailable leaf key in the reduced tree. Aspects may include suspending, by the system, rebalancing of the reduced tree during the recovering, and rebalancing the recovered tree upon completion of the recovering.

Aspects may include, at the peer zone, obtaining, by the system, the update-related information from the impacted zone, and updating, by the system, the peer tree based on the update-related information. Other aspects may include, at the peer zone, finding, by the system, each object based on the recovery range, and producing, by the system, the tree recovery journal based on each object within the recovery range, wherein each object corresponds to an add key instruction in the tree recovery journal. Still other aspects may include, at the peer zone, for each object within the recovery range, finding, by the system, the object, and, where the impacted zone is determined to be a primary zone for the object, making, by the system, the peer zone the primary zone for the object.

Sending the update-related information from the impacted zone to the peer zone may comprise draining a journal replication queue maintained at the impacted zone.

One or more aspects may include a first storage node of a first zone of a geographically distributed storage environment, the first storage node communicatively coupled to a second storage node of a second zone of the geographically distributed storage environment. The first storage node comprises first recovery logic configured to communicate with the second storage node to request a tree recovery operation, to provide update information to the second storage node, to identify a recovery range, and to provide the recovery range to the second storage node. The recovery range comprises one or more key values corresponding to one or more lost objects of an impacted tree in the first zone comprising an unavailable tree part. The second storage node comprises second recovery logic configured to update the second zone based on the update information, to identify each object corresponding to the recovery range in a second tree that is a peer tree to the impacted tree, and to produce a tree recovery journal for the impacted tree part based on the recovery range. The first recovery logic of the first storage node is further configured to receive the tree recovery journal communicated from the second storage node, and to process the tree recovery journal to recover the unavailable tree part to provide a recovered tree relative to the impacted tree.

The first recovery logic may cut off the unavailable tree part of the impacted tree to generate a reduced tree, block rebalancing of the reduced tree, and rebalance the recovered tree. The recovered tree may comprise a B+ tree in which each object is represented by a key-value pair in a leaf node of the B+ tree.

The update information may comprise at least one tree update journal, and the second recovery logic may update the second zone based at least in part on the at least one tree update journal.

Each object in the peer tree may be associated with an identifier of a primary zone, and the second recovery logic may change the identifier of the primary zone for an object corresponding to the recovery range that identifies the first zone as the primary zone identifier of the object to identify the second zone as the primary zone identifier of the object.

One or more aspects may comprise operations comprising recovering an impacted tree part of an impacted tree in an impacted zone of a geographically distributed storage environment, the impacted tree part comprising one or more tree elements that are unavailable within the impacted tree. The recovering comprises, at the impacted zone, identifying a recovery range corresponding to the impacted tree part; and sending the recovery range to a peer zone of the geographically distributed storage environment. After the peer zone has located, via a peer tree to the impacted tree, one or more objects corresponding to the recovery range, and has produced a tree recovery journal including an add request for each object corresponding to the recovery range, described herein is receiving the tree recovery journal from the impacted zone and at the impacted zone, processing the tree recovery journal to recover the impacted tree part.

Receiving the tree recovery journal may comprise receiving the tree recovery journal after the peer zone has updated the peer tree before locating the one or more objects corresponding to the recovery range via the peer tree.

Aspects may include, at the impacted zone, cutting off the unavailable tree part of the impacted tree to generate a reduced tree. Identifying the recovery range corresponding to the impacted tree part may comprise determining one or more missing leaf nodes in the reduced tree.

Aspects may include, at the impacted zone, blocking rebalancing of the reduced tree, processing the tree recovery journal with respect to the reduced tree to recover the impacted tree part to provide a recovered tree, and allowing rebalancing of the recovered tree. Receiving the tree recovery journal may comprise receiving the tree recovery journal after the peer zone has changed a primary zone identifier associated with an object corresponding to the recovery range from an impacted zone identifier to a peer zone identifier.

Example Computing Device

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
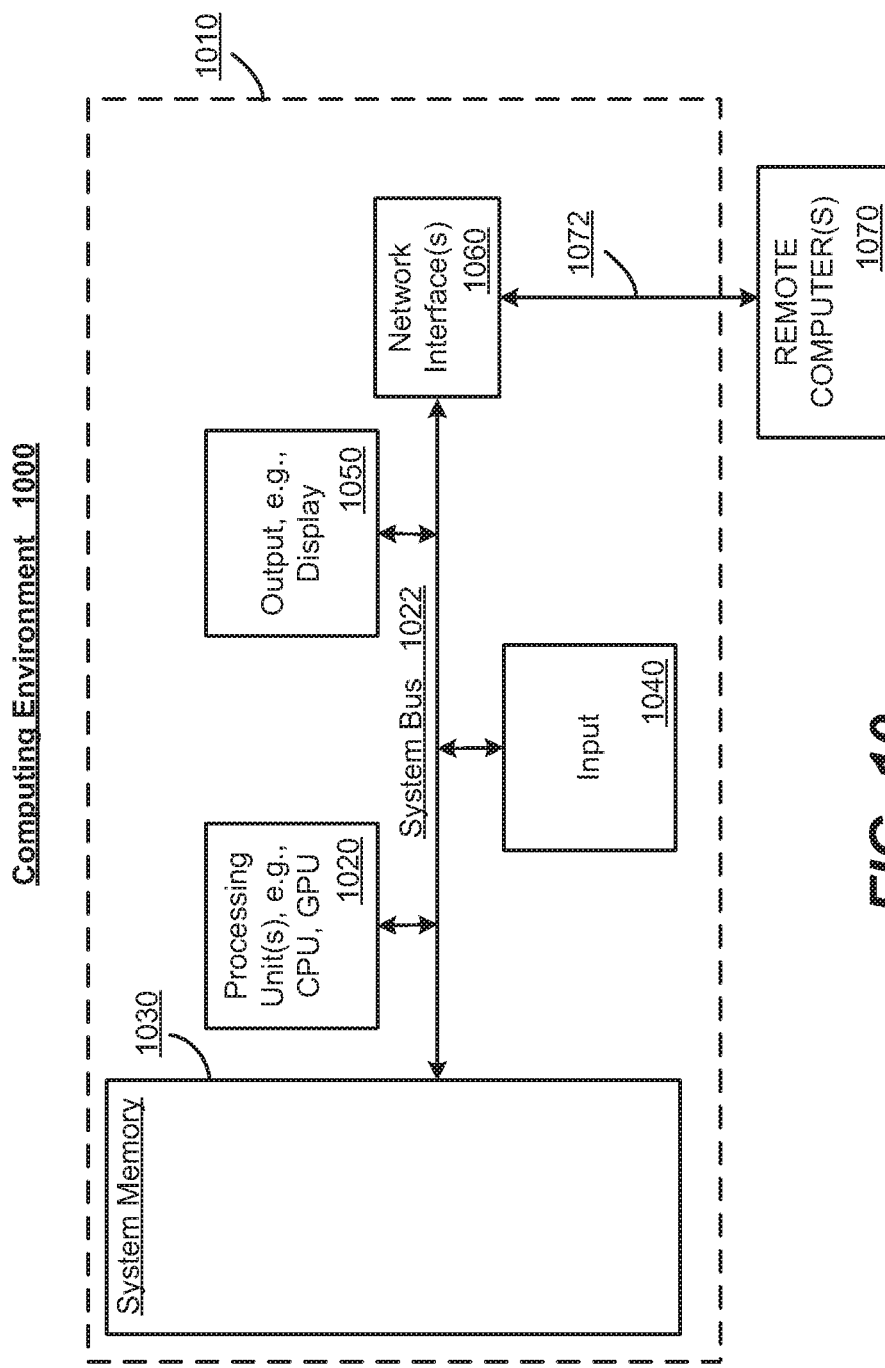
FIG. 10 is a block diagram representing an example computing environment into which aspects of the subject matter described herein may be incorporated.

FIG. 10 thus illustrates an example of a suitable computing system environment 1000 in which one or aspects of the implementations described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more implementations includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine (e.g., computer) readable media and can be any available media that can be accessed by a machine such as the computer 1010. The system memory 1030 may include computer storage media in the form of volatile and/or nonvolatile memory such as read only memory (ROM) and/or random access memory (RAM), and hard drive media, optical storage media, flash media, and so forth. By way of example, and not limitation, system memory 1030 may also include an operating system, application programs, other program modules, and program data.

A user can enter commands and information into the computer 1010 through one or more input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
    recovering, by a system comprising a processor, an impacted tree of an impacted zone of a geographically distributed storage environment resulting in a recovered tree, the impacted tree comprising an impacted tree part, the impacted tree part comprising one or more tree elements that are unavailable within the impacted tree, the recovering comprising:
        sending update-related information associated with a recovery operation for the impacted tree from the impacted zone to a peer zone for use by the peer zone in updating a peer tree of the peer zone;
        identifying a recovery range corresponding to the impacted tree part;
        sending the recovery range to the peer zone;
        receiving a tree recovery journal from the peer zone corresponding to the recovery range;
        processing the tree recovery journal to recover the impacted tree part to generate the recovered tree;
    suspending, by the system, rebalancing of the impacted tree during the recovering; and
    upon completion of the recovering, rebalancing, by the system, the recovered tree,
    wherein the recovery range corresponds to an interval at a node level of the impacted tree determined by traversing a reduced tree generated by cutting off an unavailable part of the impacted tree.

2. The method of claim 1, wherein the tree recovery journal comprises one or more instructions, and wherein the processing of the tree recovery journal comprises adding a leaf node to the recovered tree for at least some of the one or more instructions in the tree recovery journal.

3. The method of claim 1, further comprising selecting, by the system, the peer zone from available peer zones.

4. The method of claim 3, wherein the selecting the peer zone from the available peer zones comprises selecting the peer zone based on at least one of: load information associated with the peer zone or throughput information associated with the peer zone.

5. The method of claim 1, wherein the identifying the recovery range corresponding to the impacted tree part comprises removing a reference, in a tree node, to the unavailable part of the impacted tree resulting in the reduced tree, and wherein the identifying the recovery range comprises determining each unavailable leaf key in the reduced tree.

6. The method of claim 1, wherein
    the peer tree is a replicated version of the impacted tree, and the method further comprises, in response to receiving the recovery range from the impacted zone:
    facilitating replaying, at the peer zone, a tree journal of the peer zone and a journal of a replication queue of the impacted zone to update the peer tree, resulting in an updated peer tree, and
    from objects found within the recovery range in the updated peer tree, facilitating producing, at the peer zone, the tree recovery journal for the impacted zone.

7. The method of claim 1, further comprising, at the peer zone, obtaining, by the system, the update-related information from the impacted zone, and updating, by the system, the peer tree based on the update-related information.

8. The method of claim 1, further comprising, at the peer zone, finding, by the system, each object based on the recovery range, and producing, by the system, the tree recovery journal based on each object within the recovery range, wherein each object corresponds to an add key instruction in the tree recovery journal.

9. The method of claim 1, further comprising, at the peer zone, for each object within the recovery range, finding, by the system, the object, and, where the impacted zone is determined to be a primary zone for the object, making, by the system, the peer zone the primary zone for the object.

10. The method of claim 1, wherein the sending the update-related information from the impacted zone to the peer zone comprises draining a journal replication queue maintained at the impacted zone.

11. A system, comprising:
    at least one server configured to implement a first storage node of a first zone of a geographically distributed storage environment, the first storage node communicatively coupled to a second storage node of a second zone of the geographically distributed storage environment, the first storage node comprising first recovery logic configured to communicate with the second storage node to request a tree recovery operation, to provide update information associated with the tree recovery operation to the second storage node, to identify a recovery range, and to provide the recovery range to the second storage node, the recovery range comprising one or more key values corresponding to one or more lost objects of an impacted tree in the first zone comprising an unavailable tree part, wherein the second storage node comprises second recovery logic configured to update the second zone based on the update information, to identify each object corresponding to the recovery range in a second tree that is a peer tree to the impacted tree, and to produce a tree recovery journal for the impacted tree part based on the recovery range, wherein the first recovery logic of the first storage node is further configured to receive the tree recovery journal communicated from the second storage node, and to process the tree recovery journal to recover the unavailable tree part to provide a recovered tree relative to the impacted tree, the first recovery logic is further configured to cut off the unavailable tree part of the impacted tree to generate a reduced tree, to block rebalancing of the reduced tree, and to rebalance the recovered tree, and the recovery range corresponds to an interval at a node level of the impacted tree determined by traversing the reduced tree.

12. The system of claim 11, wherein the node level of the impacted tree corresponds to a leaf node level, and the recovery range is defined in terms of leaf nodes bounding the impacted tree part and defining the interval.

13. The system of claim 11, wherein the recovered tree comprises a B+ tree in which each object is represented by a key-value pair in a leaf node of the B+ tree.

14. The system of claim 11, wherein the update information comprises at least one tree update journal, and wherein the second recovery logic is configured to update the second zone based at least in part on the at least one tree update journal.

15. The system of claim 11, wherein each object in the peer tree is associated with an identifier of a primary zone, and wherein the second recovery logic is further configured to change the identifier of the primary zone for an object corresponding to the recovery range that identifies the first zone as the primary zone identifier of the object to identify the second zone as the primary zone identifier of the object.

16. A non-transitory machine-readable storage medium, comprising executable instructions that, when executed by a processor, facilitate performance of operations, the operations comprising:

recovering an impacted tree part of an impacted tree in an impacted zone of a geographically distributed storage environment, the impacted tree part comprising one or more tree elements that are unavailable within the impacted tree, the recovering comprising, at the impacted zone,
identifying a recovery range corresponding to the impacted tree part; and
sending the recovery range to a peer zone of the geographically distributed storage environment;

after the peer zone has located, via a peer tree to the impacted tree, one or more objects corresponding to the recovery range, and has produced a tree recovery journal including an add request for each object corresponding to the recovery range, receiving the tree recovery journal from the peer zone; and at the impacted zone,
processing the tree recovery journal to recover the impacted tree part;

wherein
the recovery range corresponds to an interval at a node level of the impacted tree determined by traversing a reduced tree generated by truncating an unavailable part of the impacted tree the operations further comprise, at the impacted zone, blocking rebalancing of the impacted tree, processing the tree recovery journal with respect to the impacted tree to recover the impacted tree part to provide a recovered tree, and allowing rebalancing of the recovered tree.

17. The non-transitory machine-readable storage medium of claim 16, wherein the receiving the tree recovery journal further comprises receiving the tree recovery journal after the peer zone has updated the peer tree before locating the one or more objects corresponding to the recovery range via the peer tree.

18. The non-transitory machine-readable storage medium of claim 16, wherein the identifying the recovery range corresponding to the impacted tree part comprises determining one or more missing leaf nodes in the reduced tree.

19. The non-transitory machine-readable storage medium of claim 16, wherein the node level of the impacted tree corresponds to a leaf node level, and the recovery range is defined in terms of leaf nodes bounding the impacted tree part and defining the interval.

20. The non-transitory machine-readable storage medium of claim 16, wherein the receiving the tree recovery journal further comprises receiving the tree recovery journal after the peer zone has changed a primary zone identifier associated with an object corresponding to the recovery range from an impacted zone identifier to a peer zone identifier.

* * * * *